United States Patent
Smith

(10) Patent No.: US 7,588,440 B2
(45) Date of Patent: Sep. 15, 2009

(54) CARRIER AIR HEATING SYSTEM FOR SCR

(75) Inventor: John William Smith, Massillon, OH (US)

(73) Assignee: Babcock & Wilcox Power Generation Group, Inc., Barberton, OH (US)

(*) Notice: Subject to any disclaimer, the term of this patent is extended or adjusted under 35 U.S.C. 154(b) by 123 days.

(21) Appl. No.: 11/105,053

(22) Filed: Apr. 13, 2005

(65) Prior Publication Data

US 2006/0234173 A1    Oct. 19, 2006

(51) Int. Cl.
   *F23J 7/00*    (2006.01)
(52) U.S. Cl. ................. 431/4; 431/5; 431/11; 423/235; 423/239.1
(58) Field of Classification Search .............. 431/5, 431/11, 4
   See application file for complete search history.

(56) References Cited

U.S. PATENT DOCUMENTS

| | | | |
|---|---|---|---|
| 5,165,903 A * | 11/1992 | Hunt et al. | 423/239.1 |
| 5,296,206 A * | 3/1994 | Cho et al. | 423/235 |
| 5,555,849 A * | 9/1996 | Wiechard et al. | 122/4 D |
| 5,918,555 A * | 7/1999 | Winegar | 110/345 |
| 5,988,115 A * | 11/1999 | Anderson et al. | 122/4 D |
| 6,168,709 B1 * | 1/2001 | Etter | 208/131 |
| 6,237,510 B1 * | 5/2001 | Tsumura et al. | 110/262 |
| 6,257,155 B1 * | 7/2001 | Greene | 110/163 |
| 6,845,612 B2 * | 1/2005 | Jobson et al. | 60/301 |

OTHER PUBLICATIONS pp. 477, Cengel, Yunus and Michael Boles. Thermodynamics: An Engineering Approach. New York: McGraw Hill, 2002.*

* cited by examiner

*Primary Examiner*—Steven B McAllister
*Assistant Examiner*—Sarah Suereth
(74) *Attorney, Agent, or Firm*—Eric Marich

(57) ABSTRACT

A heat exchanger is provided in an air duct between an air heater and a windbox of a combustion means such as a boiler. Dilution air is carried to the heat exchanger from a dilution air fan in a separate duct. The heat in the air from the air heater is transferred to the dilution air via the heat exchanger and the heated dilution air is sent to vaporize ammonia before the ammonia is introduced into an exhaust duct with a selective catalytic reduction (SCR) chamber. A bypass valve is provided around the heat exchanger for blending heated and unheated air to control the temperature of the dilution air.

3 Claims, 1 Drawing Sheet

CARRIER AIR HEATING SYSTEM FOR SCR

FIELD AND BACKGROUND OF INVENTION

The reduction of $NO_x$ has long been a concern in the field of fossil fuel combustion, particularly with the operation of modern power plants. Oxides of nitrogen are a byproduct of the combustion of hydrocarbon fuels, such as pulverized coal, gas, or oil. One typical post-combustion process for lowering the $NO_x$ emissions is that of Selective Catalytic Reduction (SCR). SCR systems use catalyst and a reactant such as ammonia gas to dissociate $NO_x$ to molecular nitrogen and water vapor.

The reduction of $NO_x$ has long been a concern in the field of fossil fuel combustion, particularly with the operation of modern power plants. Oxides of nitrogen are a byproduct of the combustion of hydrocarbon fuels, such as pulverized coal, gas, or oil. One typical post-combustion process for lowering the $NO_x$ emissions is that of Selective Catalytic Reduction (SCR). SCR systems use a catalyst and a reactant such as ammonia gas to disassociate $NO_x$ to molecular nitrogen and water vapor.

Ducts are constructed to transport air and flue gas, separately, or in combination. Combustion of hydrocarbon fuels occurs within the boiler, creating hot flue gases that are directed through an exit to a flue or gas duct. Ammonia as a reactant is introduced into the same flue or gas duct via sparger tubes which form an ammonia injection grid (AIG) and spray ammonia. The ammonia is mixed with the hot flue gases. The ammonia/flue gas mixture then enters the SCR chamber wherein catalytic reductions take place between the ammonia/flue gas mixture and the catalytic material.

After leaving the SCR, the ammonia/flue gas mixture travels to an air preheater followed by a flue gas cleaning system such as a scrubber and then to the atmosphere via a stack.

At some point before the ammonia reaches the SCR, it is vaporized. Various systems are used to supply the heat necessary for ammonia vaporization. Many of these systems are based on heating the dilution air and then using this heat to vaporize the ammonia prior to the AIG. Typically, these systems range from heating with direct fired natural gas to heating with a steam coil or electric heater. U.S. Pat. No. 5,296,206 describes a heat exchanger being used to heat the diluted air while extracting heat from the flue gas between the boiler exit and the SCR chamber inlet. The heated dilution air is then passed to a location outside the flue gas path where it is used to vaporize the ammonia entering the gas duct through the AIG.

Use of an external heat source to vaporize ammonia is disadvantageous as described in the background section of U.S. Pat. No. 5,437,851. There is a need in the fossil fuel burning industry for a means of heating dilution air in which no external energy source is needed for the heating. There is also a need for a location for the means for heating that has relatively clean air thus minimizing concerns for deposition, fouling, corrosion, and erosion.

SUMMARY OF INVENTION

It is an object of the present invention to provide a means for heating dilution air in which no external energy source is needed for the heating.

It is a further object of the present invention to provide a location for preheating dilution air that has clean air, wherein deposition, fouling, corrosion and erosion are avoided.

Accordingly, a heat exchanger is provided in an air duct between the air heater and the windbox for a combustion means such as a boiler. Dilution air is blown up to the heat exchanger from a dilution air fan in a separate duct. The dilution air is heated sufficiently by the heat exchanger and then sent to vaporize ammonia before the ammonia is transported to the AIG. A bypass valve is provided for blending heated and unheated air to control the temperature of the dilution air.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
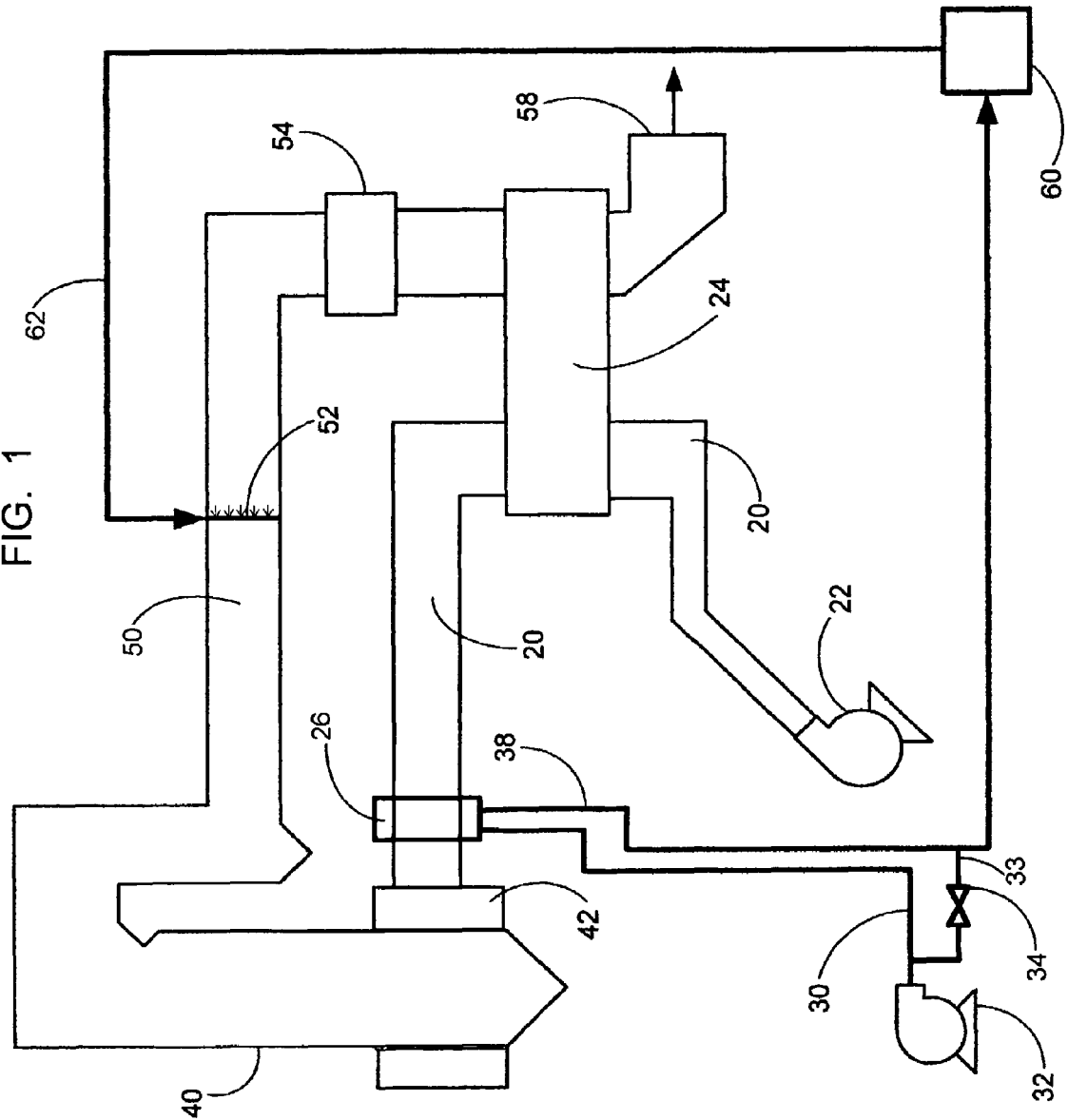
FIG. 1 is a schematic diagram of the present invention.

Referring now to-the drawings, in which like reference numerals are used to refer to the same or similar elements, FIG. 1 shows a combustion system with an arrangement for heating dilution air to vaporize ammonia and a means for combusting a fossil fuel in the presence of air, which in turn leads to a post-combustion arrangement wherein hot flue gas is mixed with the vaporized ammonia and reacted with a catalyst in an SCR chamber.

The means for providing air to the combustion means, which can be a pulverizer, not shown, for comminuting a fossil fuel, such as coal, comprises an air duct 20 leading to the combustion means 40, which can be a boiler, a forced draft fan 22 at the inlet of the air duct 20, and an air heater 24 downstream from the inlet of the air duct 20.

The arrangement for heating dilution air to vaporize ammonia comprises a dilution air duct 30 leading to the air duct 20, a dilution air fan 32 at the inlet of the dilution air duct 30, and a heat exchanger 26 positioned between a windbox 42 of the combustion means 40 and the air heater 24, and a temperature control bypass valve 34 provided around the heat exchanger 26 between the dilution air fan 32 and an ammonia skid tank 60. The dilution air duct 30 is connected to the heat exchanger 26 within the air duct 20. Another duct 38 is provided between the heat exchanger 26 and the ammonia skid tank 60.

The combustion means 40 can be a boiler, or furnace which is used to convert fuel to operate a power plant for example.

The post-combustion arrangement of the system comprises an exhaust duct 50 beginning at the exit of the combustion means, an ammonia injection grid (AIG) 52, an SCR chamber 54, an air heater 24, and an outlet 58 from the exhaust duct 50 leading to a scrubber, not shown, for further cleaning of the exhaust gas and removal of particulates.

The method of vaporizing ammonia prior to the SCR chamber 54 according to the present invention includes the following. Air is blown from the forced draft fan 22 into the air duct 20 at the air duct inlet. The air is preheated at the air heater 24 and then the heated air travels downstream to the heat exchanger 26. Dilution air is blown from the dilution air fan 32 at the inlet of the dilution air duct 30. The dilution air travels through the dilution air duct 30 to the heat exchanger 26 where a portion of the heat from the air within the air duct 20 is transferred by the heat exchanger 26 to the dilution air.

The heated dilution air then travels from the heat exchanger 26 via duct 38 to vaporize the ammonia in a portable ammonia skid tank 60. The dilution air traveling from the heat exchanger 26 to the ammonia skid tank 60 may also be blended with unheated air which bypasses the heat exchanger 26 and is blown directly from the dilution air fan 32 to the duct 38 via bypass duct 33 and valve 34.

The heated air in the air duct 20 then travels through the wind box 42 and into the combustion means 40. A fuel, such as oil, gas, or coal is fed into the combustion means 40 through burners, not shown. The fuel is mixed with the heated air and burned producing a hot flue gas. The hot flue gas then exits the combustion means 40 into exhaust duct 50.

The vaporized ammonia leaves the skid tank 60 through the ammonia duct 62 and is introduced into the exhaust duct 50 via sparger tubes which form an ammonia injection grid (AIG) 52 and spray the ammonia into the hot flue gas. The ammonia is mixed with the hot flue gas. The ammonia/flue gas mixture then enters the SCR chamber 54 wherein catalytic reductions take place between the ammonia/flue gas mixture and the catalytic material.

After leaving the SCR chamber 54, the ammonia/flue gas mixture travels through the portion of the air heater 24 in the exhaust duct 50, in which heat is absorbed from the ammonia/flue gas mixture to provide heat to the air traveling through the portion of the air heater 24 in the air duct 20. The ammonia/flue gas mixture then moves onto a flue gas cleaning system such as a scrubber, not shown, and then to the atmosphere via a stack, not shown.

While a specific embodiment of the invention has been shown and described in detail to illustrate the application of the principles of the invention, it will be understood that the invention may be embodied otherwise without departing from such principles.

I claim:

1. In combination with a fossil fuel combustion system including a boiler, an exhaust duct communicating with the boiler to receive the combustion products laden gases therefrom, a selective catalytic reduction chamber located within the exhaust duct, an air heater, an air duct for supplying substantially unadulterated heated combustion air from the air heater to the boiler, and improved apparatus for the removal of nitrogen oxides from the combustion gases including a heat exchanger and comprising an arrangement whose function is to improve the operation and extend the service life of the heat exchanger by placing said heat exchanger within the combustion products free environment of the air duct, an ammonia tank, a first duct for delivering dilution air to be heated by the heat exchanger, a second duct for receiving the heated dilution air and delivering it to the tank to vaporize the ammonia, an ammonia injection grid located within the exhaust duct upstream of the selective catalytic reduction chamber, a third duct for delivering the vaporized ammonia to the injection grid, and whereby the vaporized ammonia is injected into the combustion gases to react with the catalyst in the catalytic reduction chamber to dissociate the nitrogen oxides to molecular nitrogen and water vapor.

2. The combination according to claim 1 wherein the improved apparatus includes a dilution air bypass duct whereby dilution air being delivered to the ammonia tank can circumvent the heat exchanger.

3. The combination according to claim 2 wherein the improved apparatus includes a valve located in the bypass duct for controlling the temperature of the dilution air being delivered to the ammonia tank by regulating the amount of dilution air circumvention the heat exchanger for blending with the heated dilution air.

* * * * *